(12) United States Patent
Baden et al.

(10) Patent No.: US 9,908,375 B2
(45) Date of Patent: Mar. 6, 2018

(54) VENTILATED KEY-SLOT FULL CIRCLE HEAT SHIELD

(71) Applicant: Goodrich Corporation, Charlotte, NC (US)

(72) Inventors: Bradley J. Baden, Troy, OH (US); Katrina Lynn King, Columbus, OH (US)

(73) Assignee: Goodrich Corporation, Charlotte, NC (US)

( * ) Notice: Subject to any disclaimer, the term of this patent is extended or adjusted under 35 U.S.C. 154(b) by 183 days.

(21) Appl. No.: 14/918,238

(22) Filed: Oct. 20, 2015

(65) Prior Publication Data

US 2017/0106973 A1 Apr. 20, 2017

(51) Int. Cl.

| | |
|---|---|
| *B60C 23/19* | (2006.01) |
| *B64C 25/36* | (2006.01) |
| *F16D 55/36* | (2006.01) |
| *F16D 65/847* | (2006.01) |
| *F16D 65/02* | (2006.01) |
| *F16D 65/78* | (2006.01) |

(52) U.S. Cl.
CPC ............ *B60C 23/19* (2013.01); *B64C 25/36* (2013.01); *F16D 55/36* (2013.01); *F16D 65/847* (2013.01); *F16D 2065/1368* (2013.01); *F16D 2065/1392* (2013.01); *F16D 2065/785* (2013.01)

(58) Field of Classification Search
CPC ....... B60C 19/00; B60C 19/002; B60C 23/18; B60C 23/19; F16D 65/10; F16D 65/847; F16D 65/827; F16D 65/807; B64C 25/42
See application file for complete search history.

(56) References Cited

U.S. PATENT DOCUMENTS

| | | | |
|---|---|---|---|
| 3,958,833 A * | 5/1976 | Stanton | .................... F16D 55/40 188/71.5 |
| 4,017,123 A | 4/1977 | Horner | |
| 4,084,857 A | 4/1978 | VanderVeen | |
| 5,002,342 A | 3/1991 | Dyko | |
| 5,199,536 A * | 4/1993 | Clark | ...................... F16D 55/36 188/264 G |
| 5,236,249 A * | 8/1993 | Han | ........................ B60C 23/18 301/6.1 |
| 7,051,845 B2 | 5/2006 | Thorp | |
| 8,157,062 B2 | 4/2012 | Enright | |
| 8,668,276 B2 | 3/2014 | Hall | |
| 9,103,393 B2 | 8/2015 | Houser | |

* cited by examiner

*Primary Examiner* — Jason Bellinger
(74) *Attorney, Agent, or Firm* — Snell & Wlmer L.L.P.

(57) ABSTRACT

Systems and methods disclosed herein may be useful for use in a wheel assembly which includes a heat shield. In this regard heat shield for a wheel may include a first member; a second member positioned radially of the first member defining an annular cavity between the first member and the second member; an opening in at least one of the first member and the second member configured to provide fluidic communication between the annular cavity and an outside of the annular cavity; and a mounting feature in operable communication with the first member and the second member configured to attach the heat shield to the wheel.

16 Claims, 7 Drawing Sheets

VENTILATED KEY-SLOT FULL CIRCLE HEAT SHIELD

FIELD

The present disclosure is related to a heat shield for use in, for example, an aircraft wheel.

BACKGROUND

Aircraft wheels assemblies often comprise heat shields located between the wheel and the brake heatsink disks. As the heat shield rotates with the wheel, it may make contact with the wheel due to centrifugal forces. At times, when contact occurs, it causes fretting of the wheel which may lead to an early failure. Therefore, preventing contact is usually desirable. Preventing contact between the wheel and heat shield also prevents heat transfer from the heat shield to the wheel. Typically, the method of preventing contact has been to use heat shield spacers ("bumpers") comprising a rubber material. Due to exposure to high temperatures in service, the rubber spacers may become brittle over time and burn off the heat shields, leaving the wheel unprotected from fretting until the next overhaul.

SUMMARY

A heat shield for a wheel is provided. A heat shield for a wheel may comprise a first member; a second member positioned radially of the first member defining an annular cavity between the first member and the second member; an opening in at least one of the first member and the second member configured to provide fluidic communication between the annular cavity and an outside of the annular cavity; and a mounting feature in operable communication with the first member and the second member configured to attach the heat shield to the wheel.

In various embodiments, the first member and the second member may be separated by a gap. The opening may be disposed on at least one of an outboard rim or an inboard rim of the heat shield. The heat shield may comprise a key slot tab and a key slot disposed in the key slot tab. A first key slot ventilation aperture and a second key slot ventilation aperture may be located between the first member of the heat shield and the key slot tab. The key slot may be configured to receive at least a portion of a torque bar to couple the torque bar to the heat shield. At least one of the first member or the second member may comprise a dimple, the dimple configured to maintain a gap between the first member and the second member. The mounting feature may be configured to maintain a gap between the heat shield and the wheel. The heat shield may comprise a single unitary member.

A wheel assembly may comprise: a wheel; and a heat shield comprising: a first member; a second member positioned radially inward of the first member defining an annular cavity between the first member and the second member; an opening in at least one of the first member and the second member configured to provide fluidic communication between the annular cavity and an outside of the annular cavity; and a mounting feature in operable communication with the first member and the second member configured to attach the heat shield to the wheel.

In various embodiments, the wheel assembly may further comprise a torque bar located radially inward from the heat shield, the torque bar configured to be coupled to a brake stack. The wheel assembly may further comprise a key slot, wherein the key slot may be configured to receive at least a portion of a torque bar to couple the heat shield to the torque bar. The opening may be disposed on at least one of an outboard rim or an inboard rim of the heat shield. The heat shield may comprise a key slot tab and key slot disposed in the key slot tab. A first key slot ventilation aperture and a second key slot ventilation aperture may be located between the first member of the heat shield and the key slot tab. At least one of the first member or the second member may comprise a dimple, the dimple configured to maintain a gap between the first member and the second member. The mounting feature may be configured to maintain a gap between the heat shield and the wheel. The heat shield may comprise a single unitary member.

A method for assembling a wheel assembly may comprise: coupling a heat shield comprising a circular geometry to a wheel via a mounting feature, the heat shield located radially inward from a wheel rim and the wheel rim circumferentially surrounding the heat shield; and coupling the heat shield to a torque bar via a key slot.

In various embodiments, the key slot may be located on a first rim of the heat shield and the mounting feature may be located on a second rim of the heat shield.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As described herein, a heat shield may comprise a first member and a second member wherein a gap exists between the first member and the second member. Accordingly, an annular shaped cavity may be defined by the first member and the second member. The first member and the second member may be coupled together to form a heat shield. Thus, the heat shield may comprise a single unitary member comprising a full circular geometry. The heat shield may comprise several openings whereby air may be ventilated in and out the heat shield cavity. In this regard, a full circle heat shield comprising openings may reduce heat transfer between a brake stack and a wheel and may be able to shed liquids, thus preventing corrosion.

Figure 1:
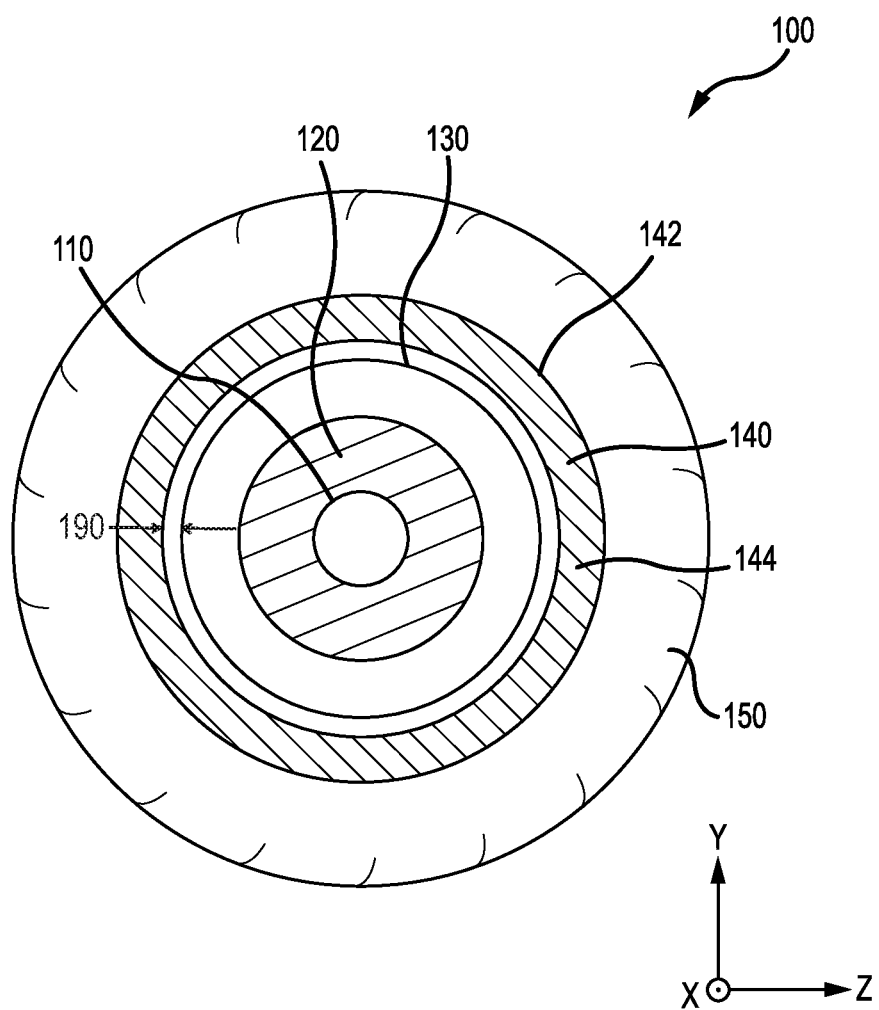
FIG. 1 illustrates, in accordance with various embodiments, an inboard side view of a wheel assembly.

With reference to FIG. 1, a side-view of wheel assembly 100 is illustrated in accordance with various embodiments. Wheel assembly 100 may include wheel 140, heat shield 130, and brake stack 120. Wheel assembly 100 may also include tire 150. In various embodiments, wheel 140 may include hub 110. Hub 110 may be the point of contact between an axle of an aircraft or vehicle and wheel assembly 100. Hub 110 may define a center bore of wheel 140. In various embodiments, wheel 140 may include wheel flange 142. Wheel flange 142 may extend radially outwards from wheel 140. Tire 150 may be coupled circumferentially around wheel 140. Heat shield 130 may be located radially inward from wheel flange 142. Brake stack 120 may be located radially inwards from heat shield 130. Wheel 140 may include wheel rim 144. Heat shield 130 may be located radially inwards from wheel rim 144. Accordingly, heat shield 130 may be coupled between brake stack 120 and wheel 140.

When wheel assembly 100 is mounted onto an aircraft or any other vehicle, inboard is defined as the direction facing towards the center of the aircraft or vehicle structure and outboard is defined as the direction facing outward or away from the center of the aircraft or vehicle structure. In the illustrated embodiments, inboard and outboard refer to the directions indicated, but in alternate embodiments, they may be reversed.

Figure 2:
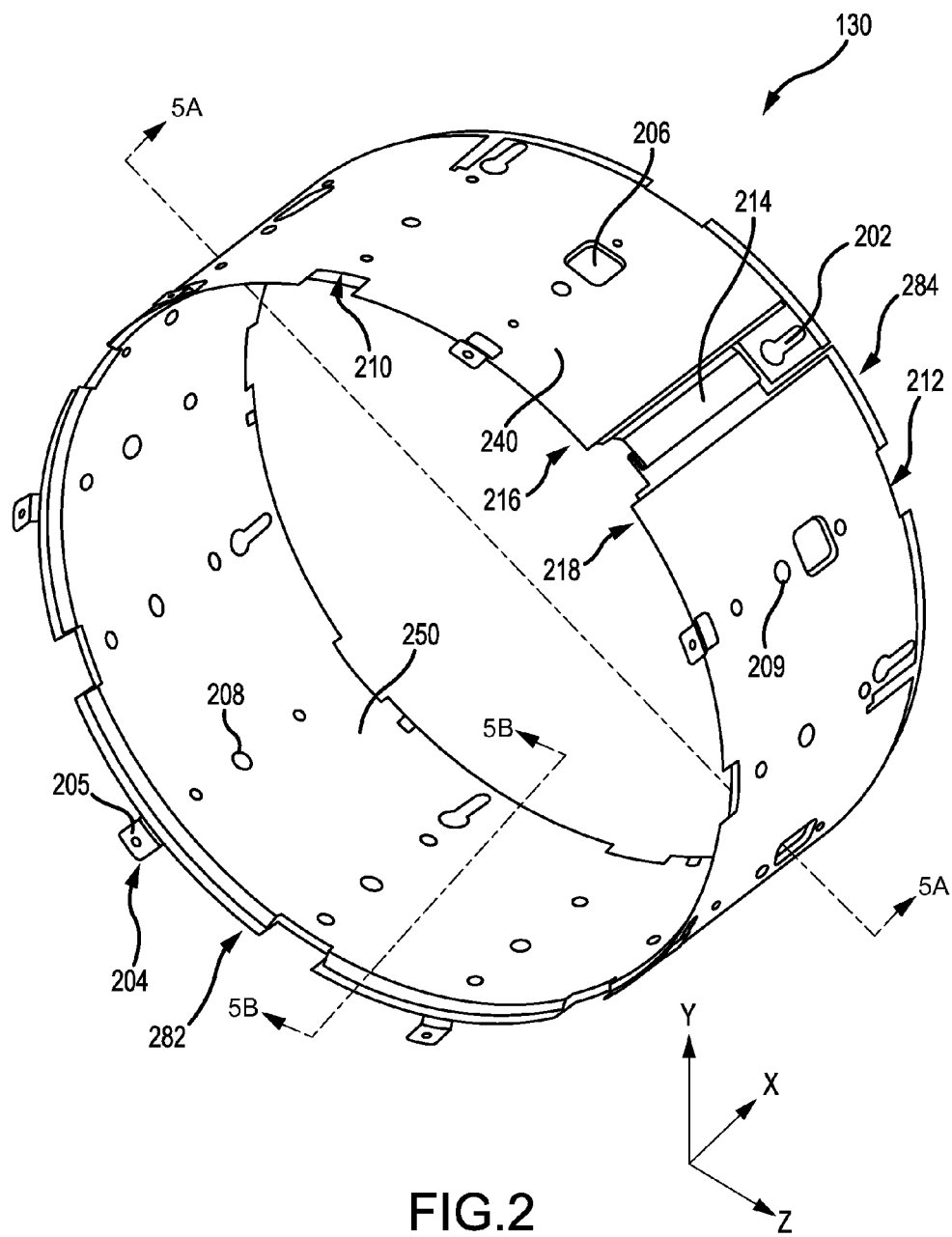
FIG. 2 illustrates, in accordance with various embodiments, a perspective view of a heat shield.

With respect to FIG. 2 through FIG. 5B, elements with like element numbering as depicted in FIG. 1 are intended to be the same and will not necessarily be repeated for the sake of clarity. With respect to FIG. 3 through FIG. 5B, elements with like element numbering as depicted in FIG. 2 are intended to be the same and will not necessarily be repeated for the sake of clarity.

With reference to FIG. 2, a perspective view of heat shield 130 is illustrated in accordance with various embodiments. In various embodiments, heat shield 130 may comprise a dual layer heatshield comprising a first member 240 and a second member 250. In various embodiments, heat shield 130 may be referred to as an "air gap heat shield." With momentary reference to FIG. 5A, a partial cross-section view of heat shield 130 is taken along arrow 5A-5A of FIG. 2. In various embodiments, first member 240 may be separated from ID surface 250 by gap 505. Thus, cavity 510 may be defined by first member 240 and by second member 250. In various embodiments, cavity 510 may be configured to prevent heat transfer between second member 250 and first member 240.

In various embodiments, heat shield 130 may comprise a plurality of key slots, such as key slot 202 for example. In various embodiments, key slot 202 may be used to couple heat shield 130 to a torque bar as described below with reference to FIG. 3. In the embodiment illustrated in FIG. 2, key slot 202 is located on an outboard rim 284 (positive x-direction) of heat shield 130. However, in various embodiments, key slot 202 may be located on any suitable side of heat shield 130.

In various embodiments, first member 240 of heat shield 130 may comprise a plurality of cavities, such as indentation 206 for example. In various embodiments, indentation 206 may be configured to provide clearance for a wheel fuse plug. In various embodiments, indentation 206 may comprise a rectangular geometry. However, indentation 206 may comprise any geometry.

In various embodiments, first member 240 of heat shield 130 may comprise a plurality of dimples, such as dimple 209 for example. Dimple 209 may extend towards second member 250. Dimple 209 may comprise a circular, ovular, square, elliptical, or any other suitable geometry. In various embodiments, dimple 209 may be configured to maintain clearance between first member 240 and second member 250. Stated another way, dimple 209 may help maintain a width of gap 505 (see FIG. 5A). in various embodiments, dimple 209 may help hold together first member 240 and second member 250. In various embodiments, dimply 209 may help maintain rigidity of heat shield 130. In various embodiments, second member 250 of heat shield 130 may comprise a plurality of dimples, such as dimple 208 for example. Dimple 208 may extend towards first member 240. Dimple 208 may be similar to dimple 209.

In various embodiments, heat shield 130 may comprise a plurality of openings, such as opening (also referred to herein as ventilation aperture) 210, for example. In various embodiments, ventilation aperture 210 may be defined by first member 240 and second member 250. In various embodiments, ventilation aperture 210 may be located on an inboard rim 282 (negative x-direction) of heat shield 130. As used herein, outboard rim 284 may be referred to as a first rim and inboard rim 282 may be referred to as a second rim. In the embodiment illustrated in FIG. 2, ventilation aperture 210 comprises a rectangular geometry. However, ventilation aperture 210 may comprise any suitable geometry. With temporary reference to FIG. 5A, ventilation aperture 210 may be configured to allow air within cavity 510 to exit cavity 510. Accordingly, heat may be transferred from air inside of cavity 510 to air located outside of cavity 510. Stated another way, ventilation aperture 210 may be configured to allow heat to exit cavity 510. Ventilation aperture 210 may provide cooling to heat shield 130. In various embodiments, ventilation aperture 210 may allow fluids, such as water for example, to escape cavity 510. Thus, ventilation aperture 210 may be configured to provide fluidic communication between cavity 510 and a location outside of cavity 510.

In various embodiments, heat shield 130 may comprise a plurality of openings, such as opening (also referred to herein as cut out) 212, for example. In various embodiments, cut out 212 may be located on outboard rim 284 (positive x-direction) of heat shield 130. In various embodiments, cut out 212 may provide fluidic communication between first member 240 and second member 250. Stated another way, cut out 212 may provide fluidic communication between a radially inward portion of heat shield 130 and a radially outward portion of heatshield 130.

In various embodiments, heat shield 130 may comprise a plurality of mounting features, such as mounting feature 204 for example. In various embodiments, mounting feature 204 may comprise a tab. However, mounting feature 204 may comprise any feature suitable of coupling heat shield 130 to an adjacent component. In the embodiment as illustrated in FIG. 2, mounting feature 204 may be coupled to the inboard rim 282 (negative x-direction) of heat shield 130. However, in various embodiments, mounting feature 204 may be coupled to any suitable side of heat shield 130. Mounting feature 204 may be used to couple heat shield 130 to a wheel; such as wheel 140 (see FIG. 1) for example. In various embodiments, mounting feature 204 may be coupled to first member 240 of heat shield 130 via a weld, solder, or braze process. However, mounting feature 204 may be coupled to heat shield 130 via any suitable method. Accordingly, mounting feature 204 may be in operable communication with first member 240 and/or second member 250 of heat shield 130. Mounting feature 204 may comprise an aperture 205 which is used to insert an attachment device, such as a screw or bolt for example, to couple mounting feature 204 to a wheel. In various embodiments, heat shield 130 may be coupled to an inboard side of wheel 140. In various embodiments, heat shield 130 may be coupled radially inward from wheel flange 142 such that wheel 140 circumferentially surrounds heat shield 130. Mounting feature 204 may be configured to maintain a gap 190 between heat shield 130 and wheel 140, with momentary combined reference to FIG. 1 and FIG. 2.

Figure 4A:
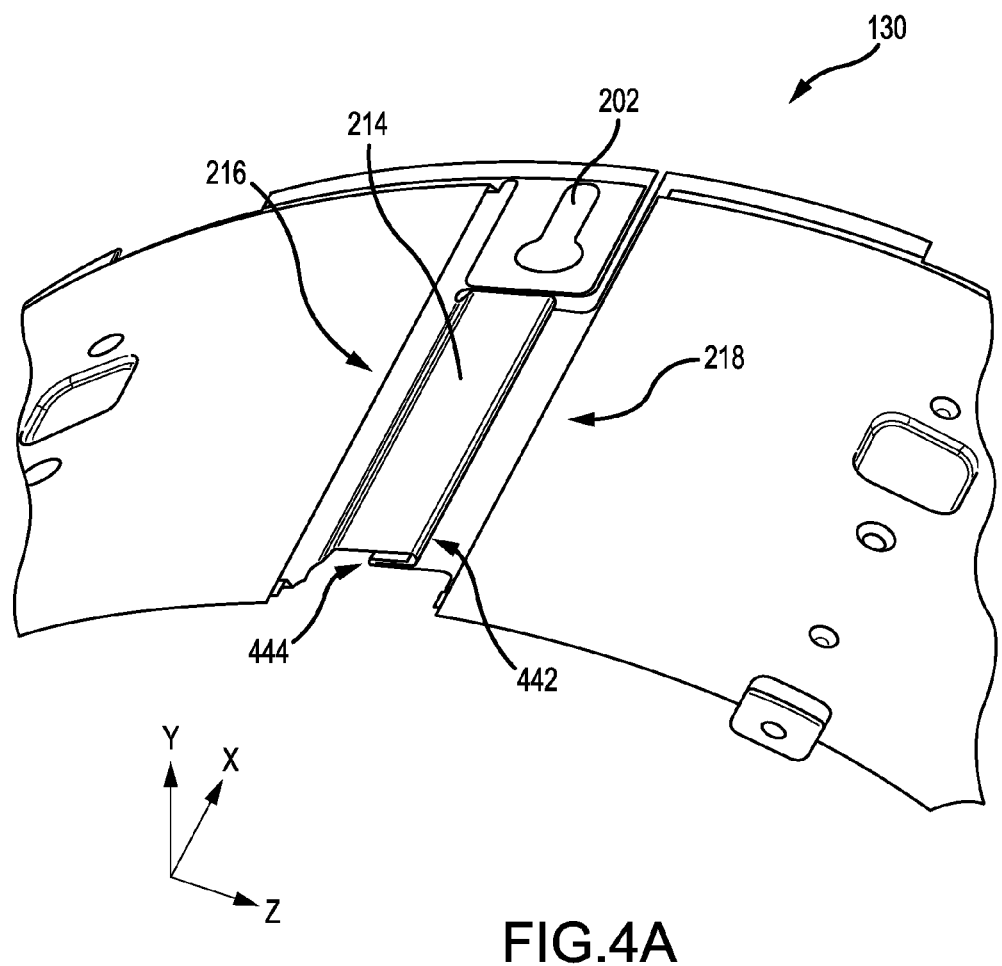
FIG. 4A illustrates, in accordance with various embodiments, a perspective view of a radially outward portion of a joint in a heat shield.
Figure 4B:
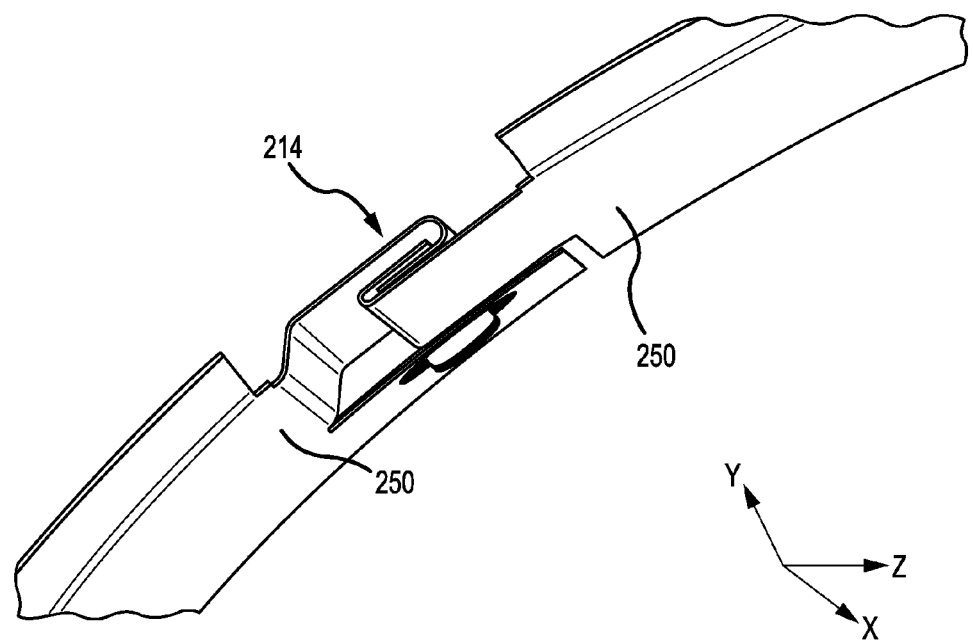
FIG. 4B illustrates, in accordance with various embodiments, a perspective view of a radially inward portion of a joint in a heat shield.

In various embodiments, heat shield 130 may comprise joint 214. In various embodiments, heat shield 130 may be assembled by rolling sheet metal into an annular geometry and joining a first side 216 and a second side 218 together to form joint 214. With additional reference to FIG. 4A and FIG. 4B, joint 214 may be formed by creating a bend 442 in the second member 250 of first side 216 and a bend 444 in the second member 250 of second side 218 and interlocking each side as illustrated in FIG. 4A and FIG. 4B. However, in various embodiments, first side 216 and second side 218 may be coupled via any suitable method to form joint 214.

Figure 5A:
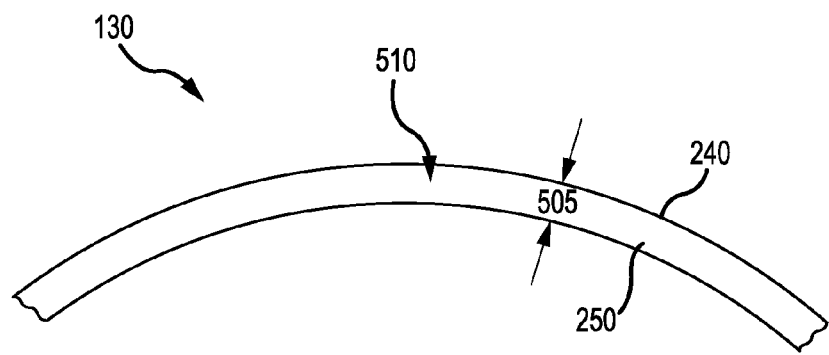
FIG. 5A illustrates, in accordance with various embodiments, a partial cross-section view of a heat shield is taken along arrow 5A-5A of FIG. 2.
Figure 5B:
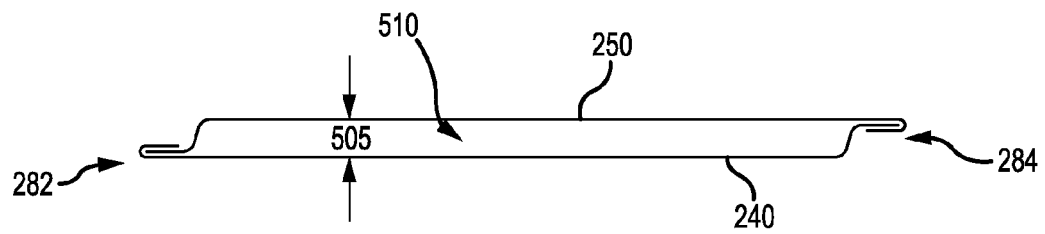
FIG. 5B illustrates, in accordance with various embodiments, a partial cross-section view of a heat shield is taken along arrow 5B-5B of FIG. 2.

In various embodiments, with reference to FIG. 5B, first member 240 may be coupled to second member 250 along outboard rim 284, as illustrated in FIG. 5B. In various embodiments, first member 240 may be coupled to second member 250 along inboard rim 282, as illustrated in FIG. 5B. First member 240 may be coupled to second member 250 via any suitable method including the use of fasteners, or by welding, or by crimping at the rims 282 and 284, as illustrated herein for example.

Figure 3:
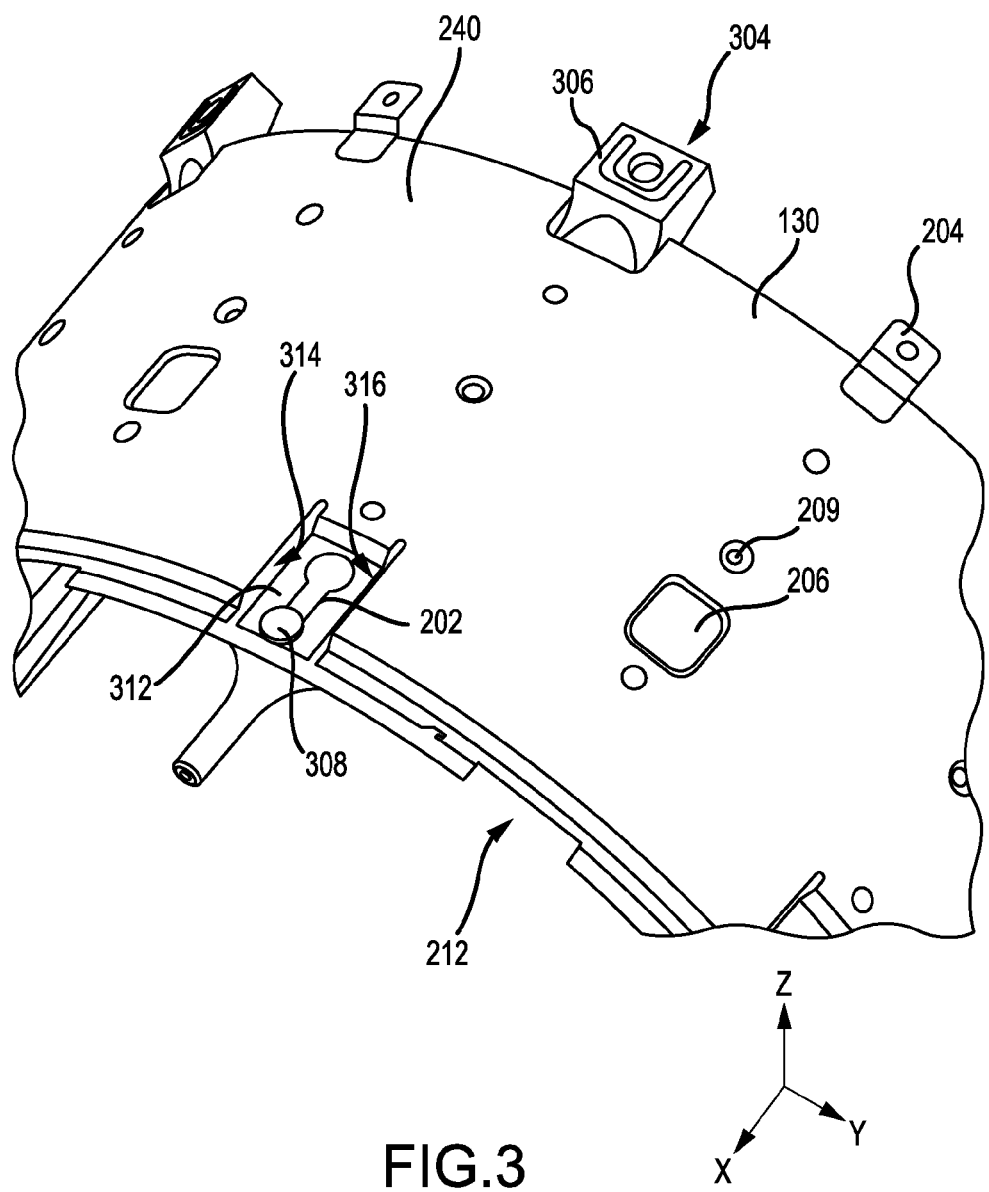
FIG. 3 illustrates, in accordance with various embodiments, a heat shield coupled to a torque bar.

With reference to FIG. 3, heat shield 130 may comprise a plurality of key slot tabs, such as key slot tab 312 for example. In various embodiments, first member 240 may include key slot tab 312. In various embodiments, key slot tab 312 may be coupled to second member 250 (see FIG. 2). For example, key slot tab 312 may be welded to second member 250. However, any method of coupling key slot tab 312 to second member 250 is contemplated herein. In various embodiments, coupling key slot tab 312 to second member 250 (see FIG. 2) may provide added strength around the edges of key slot 202. In various embodiments, key slot 202 may be disposed in key slot tab 312 and second member 250 (see FIG. 2). In various embodiments, torque bar 306 may comprise attachment feature 308. In various embodiments, the geometry of attachment feature 308 may be similar to the geometry of key slot 202. In various embodiments, attachment feature 308 may be configured to couple torque bar 306 to heat shield 130 via key slot 202. Thus, key slot 202 may receive attachment feature 308 of torque bar 306 to couple torque bar 306 to heat shield 130. In various embodiments, torque bar 306 may be located radially inward from heat shield 130 as shown in FIG. 3.

In various embodiments, key slot tab 312 may comprise a portion of first member 240 bent radially inwards (negative z-direction) towards second member 250 (see FIG. 2) and bent axially outwards (positive x-direction) as illustrated in FIG. 3. Accordingly, a first key slot ventilation aperture 314 and a second key slot ventilation aperture 316 may be formed between key slot tab 312 and first member 240. In various embodiments, first key slot ventilation aperture 314 and a second key slot ventilation aperture 316 may be similar to ventilation apertures 210, 212 (see FIG. 2).

With additional reference to FIG. 1, coupling heat shield 130 to torque bar 306 may prevent heat shield from moving radially outwards towards wheel 140 during operation of a vehicle to which wheel assembly 100 is attached. Accordingly, mechanical contact between heat shield 130 and wheel 140 may tend to be minimized which may tend to minimize heat transfer between heat shield 130 and wheel 140.

Figure 6:
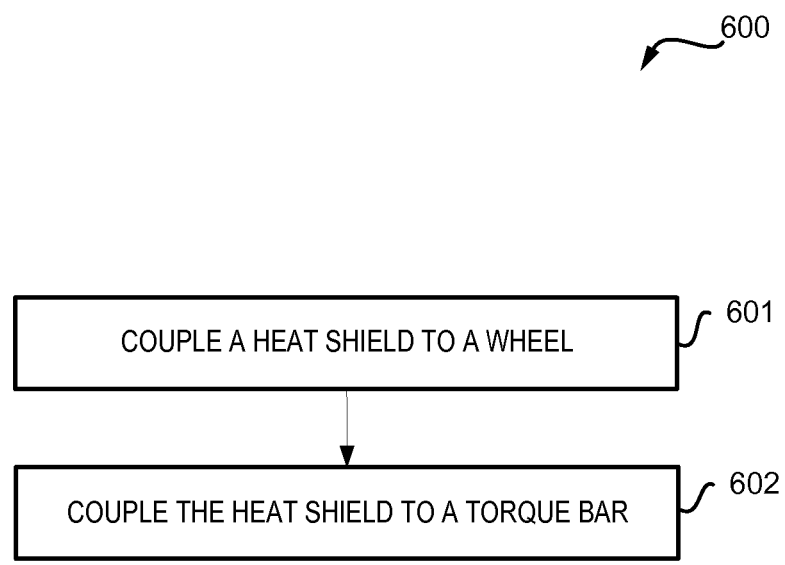
FIG. 6 illustrates, in accordance with various embodiments, a method for assembling a wheel assembly.

With reference to FIG. 6, a method for assembling a wheel assembly is described. In various embodiments, the method may include coupling a heat shield to a wheel, in step 601. Step 602 may include coupling the heat shield to a torque bar, in accordance with various embodiments. With further reference to FIG. 1 and FIG. 3, step 601 may include coupling a heat shield 130 to wheel 140 via a mounting feature 204, heat shield 130 located radially inward from wheel rim 144 and wheel rim 144 circumferentially surrounding heat shield 130, in accordance with various embodiments. In various embodiments, step 602 may include coupling heat shield 130 to torque bar 306 via key slot 202.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield for a wheel comprising:
a first member;
a second member positioned radially of the first member defining an annular cavity between the first member and the second member;
an opening in at least one of the first member and the second member configured to provide fluidic communication between the annular cavity and an outside of the annular cavity; and
a mounting feature in operable communication with the first member and the second member configured to attach the heat shield to the wheel;
a key slot tab; and
a key slot disposed in the key slot tab,
wherein a first key slot ventilation aperture and a second key slot ventilation aperture are located between the first member of the heat shield and the key slot tab.

2. The heat shield of claim 1, wherein the first member and the second member are separated by a gap.

3. The heat shield of claim 1, wherein the opening is disposed on at least one of an outboard rim or an inboard rim of the heat shield.

4. The heat shield of claim 1, wherein the key slot is configured to receive at least a portion of a torque bar to couple the torque bar to the heat shield.

5. The heat shield of claim 1, wherein at least one of the first member or the second member comprise a dimple, the dimple configured to maintain a gap between the first member and the second member.

6. The heat shield of claim 1, wherein the mounting feature is configured to maintain a gap between the heat shield and the wheel.

7. The heat shield of claim 1, wherein the first member comprises a first single unitary member and the second member comprises a second single unitary member, wherein the first member and the second member collectively form a circle.

8. A wheel assembly comprising:
a wheel; and
a heat shield comprising:
a first member;
a second member positioned radially inward of the first member defining an annular cavity between the first member and the second member;
an opening in at least one of the first member and the second member configured to provide fluidic communication between the annular cavity and an outside of the annular cavity;
a mounting feature in operable communication with the first member and the second member configured to attach the heat shield to the wheel;
a key slot tab; and
a key slot disposed in the key slot tab,
wherein a first key slot ventilation aperture and a second key slot ventilation aperture are located between the first member of the heat shield and the key slot tab.

9. The wheel assembly of claim 8, further comprising a torque bar located radially inward from the heat shield, the torque bar configured to be coupled to a brake stack.

10. The wheel assembly of claim 8, further comprising a key slot, wherein the key slot is configured to receive at least a portion of a torque bar to couple the heat shield to the torque bar.

11. The heat shield of claim 8, wherein the opening is disposed on at least one of an outboard rim or an inboard rim of the heat shield.

12. The heat shield of claim 8, wherein at least one of the first member or the second member comprise a dimple, the dimple configured to maintain a gap between the first member and the second member.

13. The heat shield of claim 8, wherein the mounting feature is configured to maintain a gap between the heat shield and the wheel.

14. The heat shield of claim 8, wherein the first member comprises a first single unitary member and the second member comprises a second single unitary member, wherein the first member and the second member collectively form a circle.

15. A method for assembling a wheel assembly, the method comprising:
coupling a heat shield comprising a circular geometry to a wheel with a mounting feature, the heat shield located radially inward from a wheel rim and the wheel rim circumferentially surrounding the heat shield; and
coupling a torque bar to a key slot disposed in a key slot tab of the heat shield,
wherein a first key slot ventilation aperture and a second key slot ventilation aperture are located between a first member of the heat shield and the key slot tab.

16. The method of claim 15, wherein the key slot is located on a first rim of the heat shield and the mounting feature is located on a second rim of the heat shield.

* * * * *